United States Patent Office 3,393,819
Patented July 23, 1968

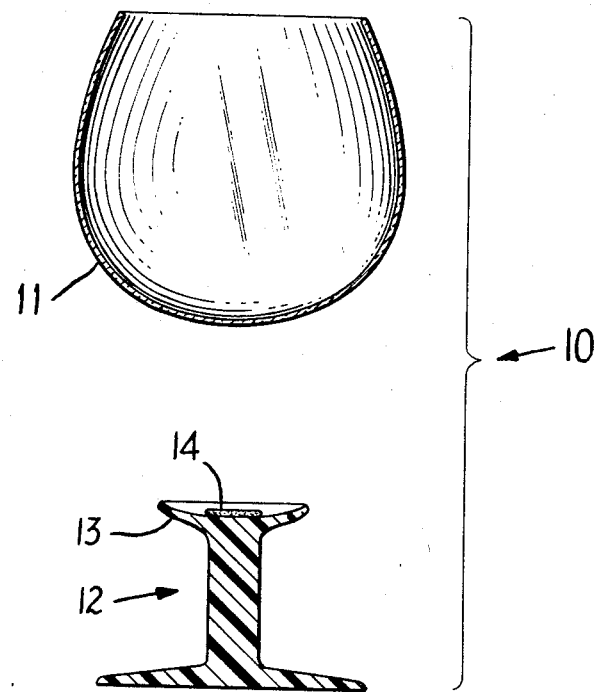

3,393,819
VESSEL AND METHOD OF MANUFACTURING THE VESSEL
Edmond Van De Walle and Marcel Van De Walle, both of 5 Square du Roule, Neuilly-sur-Seine, France, and Charles Van De Walle, deceased, late of Cannes, France, by Hilda D. Van De Walle and Janine Remond, heirs, both of Neuilly-sur-Seine, France
Continuation-in-part of abandoned application Ser. No. 308,005, Sept. 10, 1963. This application June 26, 1967, Ser. No. 649,061
Claims priority, application France, Aug. 3, 1963, 943,691, Patent 1,340,946
5 Claims. (Cl. 215—99.5)

ABSTRACT OF THE DISCLOSURE

A vessel having a poly(methyl methacrylate) base, a glass cup of uniform thickness mounted on the base and an intermediate layer constituted of poly(methyl methacrylate) bonding the cup to the base is manufactured by forming the poly(methyl methacrylate) base, forming the glass cup, etching the outer surface of the bottom of the glass cup, and assembling the cup and the base with a layer of an adhesive composition therebetween, the adhesive composition being comprised of methyl methacrylate, a catalyst for ultra-violet radiation-induced polymerization of methyl methacrylate, a thermally activatable methyl methacrylate polymerization catalyst and, preferably though not necessarily, a plasticizer for poly(methyl methacrylate), and exposing the adhesive composition layer of the assembly to ultra-violet radiation whereby the methyl methacrylate polymerizes and the resultant plasticized poly(methyl methacrylate) permanently bonds the cup and the base together.

*Cross-references to related applications*

This application is a continuation-in-part of application Ser. No. 308,005, filed Sept. 10, 1963, and now abandoned.

*Background of the invention*

This invention relates to novel vessels having a cup portion and a base portion and to a novel method of manufacturing such vessels.

Vessels having a cup portion and a base portion, commonly known as "stemware," are desired for their graceful appearance but suffer the disadvantage of generally being quite fragile. Particularly in commercial establishments, such as restaurants and hotels, where large volumes of stemware are handled and are subjected to commercial washing machines, the breakage of stemware is quite considerable. The base portion of stemware is found to break frequently due to mechanical shock. The cup portion of conventional stemware is made considerably thicker at its bottom where it joins the stem portion than at its top. Typically, the cup portion of stemware is about 1 mm. thick at the top and 4 to 7 mm. thick at the bottom. Both the cup and the base are made of glass and the increased thickness at the bottom of the cup is necessary in order that there may be carried out the hot soldering operation by which the cup and base are joined together. Unfortunately, the increased thickness of the bottom of the glass cup results in a considerable likelihood of breakage of the glass cup due to thermal shock. This can occur, for example, when a piece of stemware is taken from the washing machine while still very hot and a cold liquid is poured into it. It appears that the considerable frequency of breakage due to thermal shock is a direct result of the increased thickness of the glass cup at its bottom, which increased thickness results in poor distribution of heat. Breakage due to thermal shock generally occurs at the portion of the cup of increased thickness. For example when conventional stemware is subjected to the following test it will generally break at the portion of the cup of increased thickness: the stemware is placed in boiling water (100° C.) for a period of 3 minutes, then removed from the boiling water and immediately plunged into ice water (0° C.).

*Summary of the invention*

According to the present invention, there is provided novel stemware the base of which is resistant to mechanical shock and the cup of which is resistant to thermal shock and which, nevertheless, has the attractive appearance of conventional stemware. The stemware or vessels according to the invention each comprise a poly(methyl methacrylate) base, a glass cup of uniform thickness mounted on the base and an intermediate layer constituted of poly(methyl methacrylate) bonding the cup to the base. To manufacture this stemware, there is provided, according to the invention, a novel method comprising forming a poly(methyl methacrylate) base for the vessel, forming a glass cup of uniform thickness for the vessel, etching the outer surface of the bottom of the glass cup, and assembling the cup and base with a layer of an adhesive composition therebetween, the adhesive composition being comprised of methyl methacrylate, a catalyst for ultra-violet radiation-induced polymerization of methyl methacrylate, a thermally activatable methyl methacrylate polymerization catalyst and, preferably though not necessarily, a plasticizer for poly(methyl methacrylate), pressing the resultant assembly together and exposing the adhesive composition layer of the assembly to ultra-violet radiation while continuing said pressing whereby the methyl methacrylate polymerizes and the resultant plasticized poly(methyl methacrylate) permanently bonds the cup and the base together.

Because the optical properties of poly(methyl methacrylate) are very similar to the optical properties of glass and the presence of plasticizer does not greatly change these properties, the intermediate layer constituted of plasticized or unplasticized poly(methyl methacrylate) bonding the cup to the base is difficult to detect visually. Moreover, it is not readily apparent visually that the base and the cup are made of different materials. Also, unlike some transparent plastics, poly(methyl methacrylate) does not yellow. Furthermore, since the bonding is not accomplished by hot soldering, one is able to employ a glass cup of uniform thickness.

Stemware according to the invention is not made entirely of poly(methyl methacrylate) in order that one drinking from the stemware not be aware that it is not made entirely of glass. The user's hands and lips generally contact only the cup and not the base. Moreover, there is no substantial disadvantage in making the cup entirely of glass because it is a glass base rather than a glass cup which generally is found to break due to mechanical shock encountered in handling and washing. The thermal shock problem is overcome by virtue of the uniform thickness of the glass cup. Stemware according to the invention successfully withstands the above described thermal shock test.

*Brief description of the drawing*

The drawing is an exploded elevation, in cross-section, of a piece of stemware according to the present invention.

*Description of the preferred embodiments*

In a specific preferred embodiment according to the invention, there is formed by conventional glass-forming techniques a glass cup 11. Also, there is formed by conventional thermoplastic-forming techniques, for example, molding, a poly(methyl methacrylate) base 12 provided with a collar 13.

The portion of the outer surface of the glass cup 11 which will be bonded to the base 12, that is, the outer surface of the bottom of the glass cup 11, is etched. In preparation for the etching those portions of the outer surface of the glass cup 11 surrounding the portion to be etched may be protected by applying thereto and allowing to dry a 0.001 to 0.002 inch thick layer of a cellulose varnish, which is insensitive to the etching medium and may readily be removed by peeling once the bonding operation has been completed. The etching, i.e., local dissolution, is carried out by immersing the area to be etched in a liquid mixture consisting of 40% by weight of hydrofluoric acid and 60% by weight of ammonium difluoride. The immersion may be carried out for as short a time as a few seconds whereby the etching is imperceptible to the naked eye. When such short immersions are employed, it is not necessary to employ a protective coating as mentioned above. The glass cup 11 is then allowed to dry.

An adhesive composition is prepared by mixing 475 g. of methyl methacrylate stabilized with 0.035% by weight of methylhydroquinone (hydroquinone monomethyl ether), 1.5 g. of benzoyl phenyl carbinol (catalyst for ultra-violet radiation-induced polymerization), 1.5 g. of a 50% by weight solution of lauroyl peroxide (conventional polymerization catalyst), in dioctyl phthalate, 100 g. of dibutyl phthalate (plasticizer) and 422 g. of poly(methyl methacrylate) (in crystalline form). This adhesive composition has the consistency of a mastic, which is convenient since it makes possible the subdivision of the adhesive composition, for instance its cutting with scissors, in order to obtain small discs each of which may be used to bond together a cup and a base. The adhesive composition is rolled into a sheet about 0.01 inch thick. From this sheet there is cut a disc 14 the size of the area bounded by the collar 13.

The glass cup 11, which has a uniform thickness of 1 mm., is placed over the disc 14 on top of the base 12. This assembly is pressed together so that the pressure at the juncture of the glass cup 11, disc 14 and base 12 is about 1 to 2 kg./cm.$^2$. While this pressure is maintained, the disc 14 is subjected for about 20 minutes to ultra-violet radiation of 3,500 to 4,500 angstroms wavelength. The methyl methacrylate in the disc 14 polymerizes and the disc 14 thereby becomes an intermediate adhesive plasticized poly(methyl methacrylate) permanently bonding together the cup 11 and the base 12. The final thickness of the adhesive layer is 0.004 inch.

Alternative methods of subdividing the adhesive composition may be employed. For example, the discs may be formed by extruding a cylinder of the adhesive composition and then slicing the cylinder.

Conventional catalysts other than benzoyl phenyl carbinol may be employed as the ultra-violet radiation activatable catalyst, such as dimethylaniline and dimethylparatoluidene. These other catalysts are less preferred, however, because they usually impart a color to the adhesive composition and, accordingly, are suitable only when the cup or the base or both are colored.

It is found that if there is employed only a catalyst which is activated by ultra-violet radiation, the polymerization proceeds much too slowly. On the other hand, if it is found that if there is additionally employed a catalyst which normally is activated only thermally, the polymerization proceeds rapidly. Though the polymerization in the present invention is by ultra-violet radiation, it is found that once the catalyst which is activated by ultra-violet radiation has been activated a thermally activatable catalyst which is also present will also become activated; it is thought that this is due to the fact that the polymerization is exothermic whereby the heat released by the polymerization induced by the ultra-violet activated activates the thermally activatable catalyst. Conventional thermally activatable catalysts other than lauroyl peroxide which may be employed are, for example, di-tert-butyl peroxide, diacetyl peroxide, benzoyl peroxide, di-tert-butyl diperphthalate, and 1,1-di-tert-butyl peroxy 3,5,5-trimethyl cyclohexane. In some instances it is found convenient to utilize the catalyst as a solution, e.g., a 50% by weight solution of benzoyl peroxide in dibutyl phthalate, a 50% by weight solution of di-tert-butyl diperphthalate in dimethyl phthalate, a 50% by weight solution of 1,1-di-tert-butyl peroxy 3,5,5-trimethyl cyclohexane in dibutyl phthalate and a 25% by weight solution of diacetyl peroxide in dimethyl phthalate.

The plasticizer increases the resistance of the bonding layer to low temperatures. Thus, in the vessels according to the invention in which plasticizer is included in the adhesive composition the bond between the cup and the base will remain strong even at temperatures as low as −20° C. Conventional plasticizers for poly(methyl methacrylate) other than dibutyl phthalate which may be employed are, for example, dioctyl phthalate, dioctyl adipate, and butyl-, heptyl-, octyl-, and 2-ethylhexyl-acrylates.

Commercially available methyl methacrylate as well as the acrylate plasticizers mentioned above always contain a stabilizer, either methylhydroquinone in the proportion of 0.010 to 0.050% by weight or hydroquinone in the proportion of 0.003 to 0.015% of weight. As far as the adhesive compositions of the invention are concerned, however, the stabilizer, though always present because the methyl methacrylate and acrylate plasticizers are sold that way, is not an essential constituent.

The adhesive compositions the polymerization of which results in the bonding of the cup to the base according to the invention are constituted of the following weight proportions of constituents: about 25 to 60% of methyl methacrylate monomer, 0 to about 20% of plasticizer, about 40 to 55% of poly(methyl methacrylate) and about 0.05 to 0.3% each of ultra-violet radiation activatable catalyst and thermally activatable catalyst. The very best results are attained by using the following weight proportions: about 45 to 50% of methyl methacrylate monomer, about 7 to 15% of plasticizer, about 40 to 45% of poly(methyl methacrylate) and about 0.1 to 0.2% each of the ultra-violet radiation and thermally activatable catalysts.

In addition to the advantages mentioned above, stemware according to the present invention has still further advantages. The strength of the bond between the cup and the base is so strong that it is less likely to break than the cup or the base themselves. The appearance of the juncture of the cup and the base is even superior to the appearance of the juncture of the cup and the base of conventional all-glass stemware. In conventional all-glass stemware, the juncture between the cup and the base frequently has an irregular appearance due to the hot soldering operation employed. Also, since the glass cup of stemware of the invention is thin throughout there is less volume of glass to transfer its heat to a chilled drink contained in the cup whereby a chilled drink remains so for a longer period of time than in the case of conventional stemware. Another advantage is that the base can be fabricated, typically by molding, to have the appearance of cut glass and the cost of the resulting stemware is about one-third that of all-glass stemware having a cut base of the same appearance.

While the invention has been particularly described by reference to a specific embodiment thereof, it is to be understood that it is not intended to limit the scope of the invention thereby and that the scope of the invention is to be determined by reference to the appended claims.

What we claim and desire to secure by Letters Patent is:

1. A vessel comprising a poly(methyl methacrylate) base, a glass cup of uniform thickness mounted on the base, the portion of the outer surface of the bottom of the cup over the base being etched, and an intermediate layer constituted of poly(methyl methacrylate) bonding the cup to the base.

2. A vessel according to claim 1, in which the intermediate layer is further constituted of a plasticizer for the poly(methyl methacrylate) in admixture therewith, the plasticizer constituting up to about 20% by weight of the mixture.

3. A vessel according to claim 2, in which the plasticizer constitutes about 7 to 15% by weight of the mixture.

4. A method of manufacturing a vessel comprising forming a poly(methyl methacrylate) base for the vessel, forming a glass cup of uniform thickness for the vessel, etching the outer surface of the bottom of the glass cup, assembling the cup and the base with a layer of an adhesive composition therebetween, said adhesive composition being comprised by weight of about 25 to 60% of methyl methacrylate about 40 to 55% of poly(methyl methacrylate), 0 to about 20% of a plasticizer for poly(methyl methacrylate), about 0.05 to 0.3% of an ultra-violet radiation activatable catalyst and about 0.05 to 0.3% of a thermally activatable catalyst, pressing the resultant assembly together and exposing said adhesive composition layer of said assembly to ultra-violet radiation while continuing said pressing whereby said methyl methacrylate polymerizes and said cup and said base are permanently bonded together by the resultant poly(methyl methacrylate).

5. A method according to claim 4, in which the weight proportions of the adhesive composition constitutents are about 45 to 50% of the methyl methacrylate, about 40 to 45% of the poly(methyl methacrylate), about 7 to 15% of the plasticizer, about 0.1 to 0.2% of the ultra-violet radiation activatable catalyst and about 0.1 to 0.2% of the thermally activatable catalyst.

References Cited
FOREIGN PATENTS

| | | |
|---|---|---|
| 989,472 | 5/1951 | France. |
| 1,123,738 | 6/1956 | France. |

ROBERT F. BURNETT, *Primary Examiner.*

W. J. VAN BALEN, *Assistant Examiner.*